(12) United States Patent
Harima et al.

(10) Patent No.: US 11,891,756 B2
(45) Date of Patent: Feb. 6, 2024

(54) DECORATIVE PAPER FOR RESIN-IMPREGNATED DECORATIVE PLATE, RESIN-IMPREGNATED DECORATIVE PAPER, AND RESIN-IMPREGNATED DECORATIVE PLATE

(71) Applicant: TOPPAN PRINTING CO., LTD., Tokyo (JP)

(72) Inventors: Hajime Harima, Tokyo (JP); Takahiro Iseya, Tokyo (JP); Chiho Harada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 363 days.

(21) Appl. No.: 17/059,161

(22) PCT Filed: May 14, 2019

(86) PCT No.: PCT/JP2019/019135
§ 371 (c)(1),
(2) Date: Nov. 25, 2020

(87) PCT Pub. No.: WO2019/230373
PCT Pub. Date: Dec. 5, 2019

(65) Prior Publication Data
US 2021/0198845 A1    Jul. 1, 2021

(30) Foreign Application Priority Data
May 28, 2018   (JP) ................................ 2018-101795

(51) Int. Cl.
*D06N 7/00*   (2006.01)
*B32B 5/18*   (2006.01)
(Continued)

(52) U.S. Cl.
CPC ............ *D06N 7/0002* (2013.01); *B32B 5/18* (2013.01); *B32B 7/12* (2013.01); *C08G 73/0273* (2013.01);
(Continued)

(58) Field of Classification Search
CPC ..... B29C 44/022; B29C 44/348; B32B 13/04; B32B 13/06; B32B 13/08; B32B 13/10;
(Continued)

(56) References Cited

U.S. PATENT DOCUMENTS

| | | | | |
|---|---|---|---|---|
| 4,500,373 A | * | 2/1985 | Kubota | .................... B44F 9/02 156/277 |
| 2017/0217248 A1 | | 8/2017 | Szejwian | |
| 2022/0363044 A1 | * | 11/2022 | Harada | ................... B32B 21/06 |

FOREIGN PATENT DOCUMENTS

| | | | | |
|---|---|---|---|---|
| EP | 0075646 A1 | | 4/1983 | |
| EP | 2168762 A1 | * | 3/2010 | ............. B32B 23/08 |

(Continued)

OTHER PUBLICATIONS

International Search Report and Written Opinion, for International Application No. PCT/JP2019/019135, with translation, dated Jul. 30, 2019, 10 pages.

(Continued)

*Primary Examiner* — Hai Vo
(74) *Attorney, Agent, or Firm* — Squire Patton Boggs (US) LLP (57) ABSTRACT

A base paper (6), a picture pattern layer (7) provided on a surface (6*a*) side of the base paper (6), and foaming agents (8) arranged on a surface (7*a*) of the picture pattern layer (7) or in the picture pattern layer (7) are provided. In the foaming agents (8), the average particle diameter after
(Continued)

foaming is set to 15 μm or more and 250 μm or less and the foaming start temperature is set to 100° C. or more and 220° C. or less.

4 Claims, 1 Drawing Sheet

(51) Int. Cl.
  *B32B 7/12* (2006.01)
  *C08G 73/02* (2006.01)
  *B44C 5/04* (2006.01)
(52) U.S. Cl.
  CPC ..... *B32B 2260/046* (2013.01); *B32B 2451/00* (2013.01); *B44C 5/0469* (2013.01); *D06N 2209/106* (2013.01); *D10B 2503/04* (2013.01)
(58) Field of Classification Search
  CPC ....... B32B 13/12; B32B 13/14; B32B 15/043; B32B 15/082; B32B 15/085; B32B 15/088; B32B 15/09; B32B 15/10; B32B 15/12; B32B 15/14; B32B 15/18; B32B 15/20; B32B 19/04; B32B 19/041; B32B 19/042; B32B 19/045; B32B 19/046; B32B 19/06; B32B 21/02; B32B 21/042; B32B 21/06; B32B 21/08; B32B 21/10; B32B 21/14; B32B 2250/03; B32B 2255/26; B32B 2260/021; B32B 2260/028; B32B 2260/044; B32B 2260/046; B32B 2262/101; B32B 2264/0214; B32B 2266/0264; B32B 2266/0271; B32B 2266/0278; B32B 2266/0285; B32B 2307/4026; B32B 2307/406; B32B 2307/408; B32B 2307/412; B32B 2307/584; B32B 2307/718; B32B 2419/00; B32B 2451/00; B32B 2479/00; B32B 2605/003; B32B 2607/00; B32B 27/10; B32B 27/12; B32B 27/302; B32B 27/308; B32B 27/32; B32B 27/34; B32B 27/36; B32B 27/365; B32B 29/005; B32B 29/007; B32B 29/02; B32B 29/08; B32B 5/022; B32B 5/024; B32B 5/18; B32B 5/20; B32B 5/26; B32B 7/12; B44C 5/0469; C08G 73/0273; D06N 2209/106; D06N 7/0002; D10B 2503/04; D21H 17/47; D21H 19/66; D21H 21/56; D21H 27/26; D21H 27/30

See application file for complete search history.

(56) References Cited

FOREIGN PATENT DOCUMENTS

| | | |
|---|---|---|
| EP | 3206886 B1 | 11/2020 |
| JP | S58-16846 A | 1/1983 |
| JP | S58-110250 A | 6/1983 |
| JP | S59-222348 A | 12/1984 |
| JP | S62-130849 A | 6/1987 |
| JP | H06-226944 A | 8/1994 |
| JP | H07-310417 A | 11/1995 |
| JP | H09-262956 A | 10/1997 |
| JP | H10-16374 A | 1/1998 |
| JP | 2014-069396 A | 4/2014 |
| JP | 2015-174242 A | 10/2015 |
| JP | 2018-500195 A | 1/2018 |
| WO | WO-2007142593 A1 * 12/2007 | ............. B01J 13/14 |
| WO | WO 2021/085305 A1 | 5/2021 |

OTHER PUBLICATIONS

EPO Communication dated Feb. 22, 2022 forwarding the extended European Search Report for European Patent Application No. 19810551.2, 8 pages.

International Search Report and Written Opinion dated Jan. 12, 2021, for International Application No. PCT/JP2020/039763, with English translation, 15 pages.

International Preliminary Report on Patentability dated May 12, 2022, for International Application No. PCT/JP2020/039763, 6 pages.

Extended European Search Report dated Oct. 17, 2023, for European Patent Application No. 20882853.3, 8 pages.

International Preliminary Report on Patentability dated Dec. 10, 2020, for PCT/JP2019/019135, 9 pages.

* cited by examiner

DECORATIVE PAPER FOR RESIN-IMPREGNATED DECORATIVE PLATE, RESIN-IMPREGNATED DECORATIVE PAPER, AND RESIN-IMPREGNATED DECORATIVE PLATE

CROSS-REFERENCE

This application is a National Stage filing under 35 U.S.C. § 371 of International Patent Application No. PCT/JP2019/019135, filed May 14, 2019, which claims the benefit of and priority to JP Application No. 2018-101795, filed May 28, 2018, both applications are incorporated herein by reference in their entirety for all purposes.

TECHNICAL FIELD

The present invention relates to a decorative paper for resin-impregnated decorative plate, a resin-impregnated decorative paper, and a resin-impregnated decorative plate.

BACKGROUND ART

Conventionally, a method for manufacturing a resin-impregnated decorative plate has been proposed which includes causing a metal plate to abut on a laminate of a resin-impregnated decorative paper impregnated with a thermosetting resin and a woody base material, and then performing heat pressure molding, thereby obtaining a resin-impregnated decorative plate in which the resin-impregnated decorative paper and the base material are integrated (for example, see PTL 1).

In the method for manufacturing a resin-impregnated decorative plate described in PTL 1, an embossed shape is formed in a metal plate to give uneven patterns to the surface of the resin-impregnated decorative plate, thereby giving a touch feeling.

Further, a gross mat expression can also be given by adjusting the degree of roughness of the embossed shape.

However, in the method for manufacturing a resin-impregnated decorative plate described in PTL 1, the metal plate is required to prepare for each uneven pattern to be given, and therefore there is a possibility that the cost increases.

CITATION LIST

Patent Literature

PTL 1: JP 09-262956 A

SUMMARY OF INVENTION

Technical Problem

The present invention has been made focusing on the above-described problem. It is an object of the present invention to provide a decorative paper for resin-impregnated decorative plate capable of forming a resin-impregnated decorative plate excellent in a gross mat expression and a touch feeling, a resin-impregnated decorative paper, and a resin-impregnated decorative plate while reducing the cost.

Solution to Problem

In order to solve the above-described problem, one aspect of the present invention is a decorative paper for resin-impregnated decorative plate including (a) a base paper, (b) a picture pattern layer provided on the surface side of the base paper, and (c) foaming agents arranged on the surface of the picture pattern layer or in the picture pattern layer, in which, in (d) the foaming agents, the average particle diameter after foaming is 15 μm or more and 250 μm or less and the foaming start temperature is 100° C. or more and 220° C. or less.

Further, another aspect of the present invention is a resin-impregnated decorative paper including (a) the decorative paper for resin-impregnated decorative plate described above and (b) a thermosetting resin impregnated into the decorative paper for resin-impregnated decorative plate.

Further, another aspect of the present invention is a resin-impregnated decorative plate including (a) the resin-impregnated decorative paper described above and (b) a base material integrated with the resin-impregnated decorative paper.

Advantageous Effects of Invention

According to one aspect of the present invention, the average particle diameter after foaming and the foaming start temperature of the foaming agents are set to proper numerical values, and therefore the foaming agents can be foamed in heat pressure molding and uneven patterns can be properly formed on the surface of a resin-impregnated decorative plate by a conventional method for manufacturing a resin-impregnated decorative plate. Thus, a gross mat feeling and a touch feeling can be exhibited in the resin-impregnated decorative plate. Further, arbitrary uneven patterns can be given to the surface of the resin-impregnated decorative plate by adjusting the arrangement positions of the foaming agents in the decorative paper for resin-impregnated decorative plate, which eliminates the necessity of preparing the metal plate for each uneven pattern. Therefore, a decorative paper for resin-impregnated decorative plate capable of forming a resin-impregnated decorative plate excellent in a gross mat expression and a touch feeling, a resin-impregnated decorative paper, and a resin-impregnated decorative plate can be provided while reducing the cost.

DESCRIPTION OF EMBODIMENTS

Hereinafter, a decorative paper for resin-impregnated decorative plate, a resin-impregnated decorative paper, and a resin-impregnated decorative plate according to an embodiment of the present invention are described with reference to the drawing. The present invention is not limited to the embodiment described below and can also be altered, e.g., an alternation of the design, based on a knowledge of a person skilled in the art. Embodiments to which such alternations are given are also included in the scope of the present invention. Further, the drawing is illustrated in an exaggerated manner as appropriate to facilitate the understanding.

(Configuration)

Figure 1:
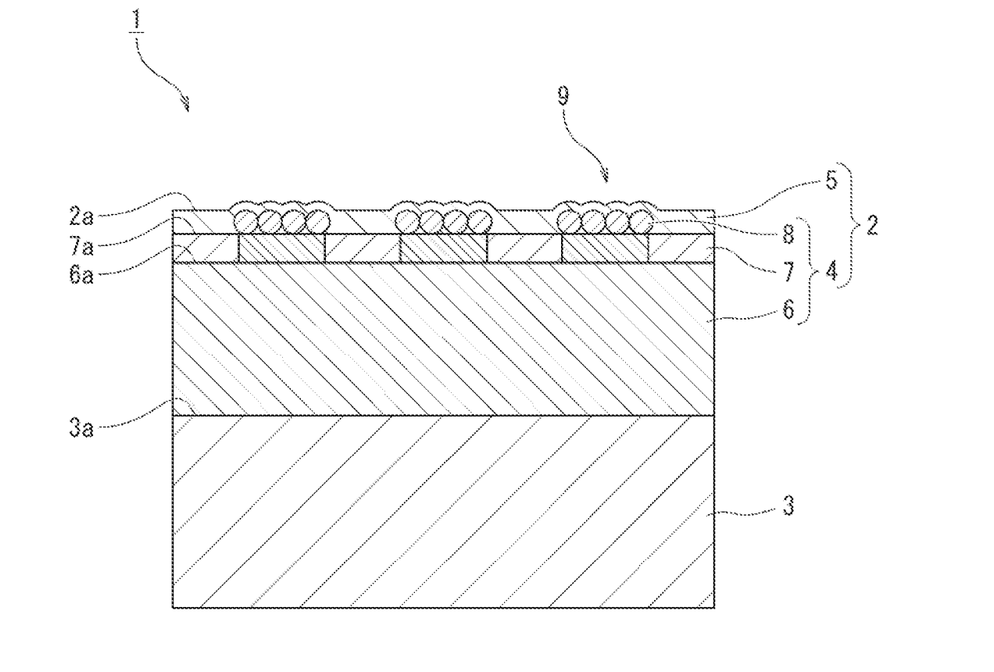
FIG. 1 is a cross-sectional view illustrating a resin-impregnated decorative plate according to an embodiment of the present invention.

As illustrated in FIG. 1, a resin-impregnated decorative plate 1 according to an embodiment of the present invention is a decorative plate obtained by applying heat pressure molding to a laminate of a resin-impregnated decorative paper 2 and a base material 3 to integrate the resin-impregnated decorative paper 2 and the base material 3. More specifically, the resin-impregnated decorative plate 1 includes the base material 3 and the resin-impregnated decorative paper 2 provided on a surface 3a side of the base material 3. The resin-impregnated decorative plate 1 according to the embodiment of the present invention is a resin-impregnated decorative plate used for interior decoration of floor surfaces, wall surfaces, ceilings, and the like of buildings, surface decorating materials of furniture, various cabinets, and the like, surface decoration of furnishings, vehicle interior decoration, and the like, for example.

(Base Material)

The kind of the base material 3 is not particularly limited. Arbitrary base materials are usable according to the intended use of the resin-impregnated decorative plate 1 to be targeted. For example, woody base materials, such as wood veneer, plywood, laminated wood, particle board, medium density fiberboard, and hard fiberboard, fibrous base materials, such as cardboard, woven fabric, nonwoven fabric, resin-impregnated paper, and resin-impregnated fabric, inorganic base materials, such as gypsum board, slate board, calcium silicate board, slag gypsum board, wood wool cement board, slag cement board, autoclaved lightweight concrete plate, and glass fiber-reinforced concrete plate, metal base materials, such as steel plate, brass plate, aluminum plate, duralumin plate, and stainless steel plate, synthetic resin base materials, such as acrylic resin plate, styrol resin plate, ABS (Acrylonitrile butadiene styrene) resin plate, polycarbonate resin plate, nylon resin plate, polystyrene resin plate, polypropylene resin plate, polyester resin plate, and glass fiber-reinforced plastic plate, and the like or composites or laminates containing two or more kinds selected from these materials and the like can be adopted.

(Decorative Paper for Resin-Impregnated Decorative Plate)

The resin-impregnated decorative paper 2 according to the embodiment of the present invention is a decorative paper obtained by impregnating the decorative paper for resin-impregnated decorative plate 4 with a thermosetting resin 5, and then drying the decorative paper for resin-impregnated decorative plate 4. The decorative paper for resin-impregnated decorative plate 4 includes a base paper 6, a picture pattern layer 7 provided on a surface 6a side of the base paper 6, and foaming agents 8 arranged on a surface 7a of the picture pattern layer 7 or in the picture pattern layer 7.

FIG. 1 illustrates an example in which the foaming agents 8 are arranged on the surface 7a of the picture pattern layer 7.

(Base Paper)

As the base paper 6, fibrous sheet-like objects, such as paper having a good water absorbing property which allows impregnation of the thermosetting resin 5, are usable. For example, thin paper, titanium paper, paper of fine quality, bleached or unbleached kraft paper, and the like can be adopted. In particular, the titanium paper is the most suitable when both a printing suitability and a resin impregnation suitability are considered. Further, when the texture of the surface 3a of the base material 3 is utilized, it is preferable to use a so-called transparent paper having a property of becoming transparent by the impregnation of the thermosetting resin 5. The thickness of the base paper 6 is not particularly limited. One having a basis weight in the range of 20 g/m² or more and 200 g/m² or less is preferable.

(Picture Pattern Layer)

The picture pattern layer 7 is a layer for giving a design property by a picture pattern to the resin-impregnated decorative paper 2. The picture pattern layer 7 is formed using a printing ink obtained by dissolving or dispersing colorants, such as dyes or pigments, into a diluent solvent together with an appropriate binder resin. The kind of the printing ink is not particularly limited. An oil-based ink or a water-based ink may be acceptable. More specifically, as the printing ink, a usual printing ink not having liquid repellency is usable.

In particular, when a thermosetting resin impregnation suitability is considered, the water-based ink is the most suitable. The water-based ink has good affinity with an aqueous solution of an impregnation resin as compared with the oil-based ink. Hence, when the water-based ink is used, the decorative paper for resin-impregnated decorative plate 4 can be quickly and uniformly impregnated with the impregnation resin in an impregnation step in manufacturing the resin-impregnated decorative plate 1 and, further, the strength can be exhibited in the excellent picture pattern layer 7 by integration with the impregnation resin. The kind of the water-based ink is not particularly limited. One containing a binder resin containing casein and an emulsion resin as a main component is preferable.

Such a binder resin has a property of becoming sparingly water-soluble bypassing through a drying step after printing of ink. Hence, when the binder resin containing such a binder resin is used, the picture pattern layer 7 is hard to re-dissolve in the aqueous solution of the impregnation resin in a resin impregnation step in manufacturing the resin-impregnated decorative plate 1, so that the picture pattern can be held and, further, the contamination of the impregnation resin can be prevented.

As the emulsion resin, an acrylic emulsion resin, a vinyl acetate emulsion resin, a styrene emulsion resin, a urethane emulsion resin, and the like can be adopted, for example. In the binder resin, a water-soluble resin, such as polyvinyl alcohol and polyacrylamide, water-soluble polymers, such as polysaccharide and cellulose derivative, and the like, for example, may be used in combination besides casein and emulsion resin in order to increase the stability of ink.

A method for forming the picture pattern layer 7 is not particularly limited. Arbitrary printing methods, such as a gravure printing method, an offset printing method, a screen printing method, a flexoprinting method, a relief printing method, and an ink jet printing method, are usable, for example. Between layers of the picture pattern layer 7 and the base paper 6, a solid ink layer intended for coloring of a base may be provided. When the solid ink layer is provided, arbitrary coating methods, such as a roll-coating method, a gravure coating method, a rod coating method, a knife coating method, an air knife coating method, a spray coating method, a lip coating method, and a die coating method, for example, are also usable as a method for forming the solid ink layer besides various printing methods described above.

The kind of a picture formed by the picture pattern layer 7 is not particularly limited. Arbitrary pictures are usable according to the intended use of the resin-impregnated decorative plate 1 to be targeted. For example, a wood grain pattern, a stone grain pattern, a fabric grain pattern, an abstract pattern, a geometric figure, a character, a sign, a monochromatic plane pattern, and the like or a combination of two or more kinds selected from the patterns above and the like can be adopted.

(Foaming Agent)

The foaming agents 8 form layers for giving a gross mat expression and a touch feeling by the uneven patterns 9 on the surface of the resin-impregnated decorative paper 2. The kind of the foaming agents 8 is not particularly limited and arbitrary foaming agents are usable. For example, pyrolytic chemical foaming agents, such as: azo-based foaming agents, such as azodicarbonamide and azobisformamide, hydrazide-base foaming agents, such as oxybenzenesulfonyl hydrazide and paratoluenesulfonyl hydrazide, and microcapsule foaming agents, and the like can be adopted.

In particular, the microcapsule foaming agents are the most suitable. The microcapsule foaming agent has a capsule and a volatile substance enclosed in the capsule. The microcapsule foaming agent enters a foamed state by expanding the capsule due to the volatilization of the volatile substance. As materials of the capsule, a vinylidene chloride-acrylonitrile copolymer and the like are usable, for example. As materials of the volatile substance, aliphatic hydrocarbon and the like are usable, for example.

As the foaming agents 8, one in which the average particle diameter before foaming is ⅔ times or more and 50 times or less the layer thickness of the picture pattern layer 7 is preferable. When the average particle diameter is less than ⅔ times the layer thickness of the picture pattern layer 7, there is a possibility that the gross mat feeling and the touch feeling are weakened. Whereas, when the average particle diameter is larger than 50 times the layer thickness of the picture pattern layer 7, there is a possibility that the foaming agents 8 after foaming may drop or the like from the decorative paper for resin-impregnated decorative plate 4, so that the scratch resistance is weakened. Herein, the average particle diameter is an average particle diameter by observation under a microscope. The average particle diameter by observation under a microscope can be obtained by, for example, observing the foaming agents 8 under a microscope, measuring the particle diameter of 100 particles of the foaming agents 8 observed under a microscope by image processing software or the like, and then averaging the measurement results by the number of the particles. As the particle diameter of the foaming agents 8, an average value of the major axis diameters and the minor axis diameters of the particles of the foaming agents 8 can be adopted.

As the foaming agents 8, one in which the average particle diameter after foaming is 15 μm or more and 250 μm or less is preferable. When the average particle diameter after foaming is less than 15 μm, there is a possibility that the gross mat feeling and the touch feeling are weakened. Whereas, when the average particle diameter after foaming is larger than 250 μm, there is a possibility that the foaming agents 8 drop or the like from the decorative paper for resin-impregnated decorative plate 4, so that the scratch resistance is weakened. The average particle diameter after foaming is more preferably 30 μm or more and 200 μm or less. Herein, the average particle diameter of the foaming agents 8 after foaming is an average particle diameter by observation under a microscope as with the average particle diameter of the foaming agents 8 before foaming. As the particle diameter of the foaming agents 8 after foaming used for the acquisition of the average particle diameter, an average value of the major axis diameters and the minor axis diameters of voids formed by the foaming of the foaming agents 8 can be adopted.

The foaming start temperature of the foaming agents 8 is preferably 100° C. or more and 220° C. or less. When the foaming start temperature is less than 100° C., the foaming start time is early, and therefore the period of time while the foaming agents 8 after foaming are heated and pressed is prolonged, so that the foaming agents 8 after foaming are crushed, and thus there is a possibility that the gross mat feeling and the touch feeling are weakened. Whereas, when the foaming start temperature is higher than 220° C., the foaming agents 8 are not sufficiently foamed by the heat pressure molding performed by causing a metal plate (mirror finished plate) on the resin-impregnated decorative paper 2 in manufacturing the resin-impregnated decorative plate 1, so that there is a possibility that the gross mat feeling and the touch feeling are weakened. 120° C. or more and 200° C. or less is more suitable.

The kind of the uneven patterns 9 formed by the foaming agents 8 after foaming is not particularly limited and may be one aligned or not aligned in terms of design with the picture formed by the picture pattern layer 7. In particular, when it is considered to obtain the resin-impregnated decorative plate 1 excellent in a design property, one aligned with the picture formed by the picture pattern layer 7 is the most suitable. When the picture formed by the picture pattern layer 7 and the uneven patterns 9 are aligned in terms of design, the arrangement positions of the foaming agents 8 are aligned with the picture formed by the picture pattern layer 7. More specifically, the foaming agents 8 are arranged on places where a lusterless texture is to be expressed in the picture formed by the picture pattern layer 7. For example, the foaming agents 8 are arranged on the surface of the picture pattern layer 7 to cover dark color portions having brightness relatively lower than that in other portions of the picture in the picture formed by the picture pattern layer 7. The ratio of the area covered with the foaming agents 8 to the area of the dark color portions is preferably 70% or more. In particular, 90% or more is the most suitable. When the picture of the picture pattern layer 7 is set to a wood grain pattern, the foaming agents 8 are arranged in a vessel pattern aligned in terms of design with the wood grain pattern of the picture pattern layer 7. The color of the foaming agents 8 is not particularly limited. The foaming agents 8 may be colorless or colored.

When the foaming agents 8 are arranged in the picture pattern layer 7, the foaming agents 8 are arranged in the picture pattern layer 7 while being mixed into dark color portions having brightness relatively lower than that in other portions of the picture in the picture formed by the picture pattern layer 7. The ratio of the volume of the foaming agents 8 to a total value of the volume of the dark color portions and the volume of the foaming agents 8 is preferably 70% or more. In particular, 90% or more is the most suitable.

A method for arranging the foaming agents 8 is not particularly limited. A method for printing a printing ink obtained by dispersing the foaming agents 8 in a diluent solvent together with an appropriate binder resin onto the picture pattern layer 7 can be adopted, for example. As the binder resin, a thermosetting resin having a urethane bond, such as a two-component curable urethane resin, a curable resin, such as an ionizing radiation curable resin, and those containing casein and an emulsion resin as a main component are usable, for example. As the thermosetting resin, melamine resin, epoxy resin, urea resin, phenol resin, unsaturated polyester resin, diallyl phthalate resin, benzoguanamine resin, urethane resin, aminoalkyd resin, silicone resin, and the like can be adopted, for example. As the ionizing radiation curable resin, (meth)acrylate resin, unsaturated polyester resin, and the like can be adopted, for example.

A method for printing the printing ink of the foaming agents 8 is not particularly limited as with the picture pattern layer 7. For example, arbitrary printing methods, such as a gravure printing method, an offset printing method, a screen printing method, a flexoprinting method, a relief printing method, and an ink jet printing method, are usable, for example.

(Method for Manufacturing Resin-Impregnated Decorative Plate)

Next, a method for manufacturing the resin-impregnated decorative plate 1 according to the embodiment of the present invention is described.

First, the decorative paper for resin-impregnated decorative plate 4 is immersed in a water-based impregnation liquid in which the thermosetting resin 5 is dissolved or dispersed in water to impregnate the decorative paper for resin-impregnated decorative plate 4 with the thermosetting resin 5.

As the thermosetting resin 5, a thermosetting resin used in manufacturing of a known resin-impregnated decorative plate is usable. For example, melamine resin, epoxy resin, diallyl phthalate resin, benzoguanamine resin, urethane resin, alkyd resin, unsaturated polyester resin, phenol resin, urea resin, and the like can be adopted. The impregnation of the thermosetting resin 5 may be performed from the surface side of the decorative paper for resin-impregnated decorative plate 4 on which the picture pattern layer 7 and the foaming agents 8 are formed or may be performed from the opposite surface side. Further, the impregnation may be performed for each surface, i.e., twice, or the impregnation may be simultaneously performed for both surfaces. The impregnation ratio (ratio of the mass of the impregnation resin to the mass of the decorative paper for resin-impregnated decorative plate 4 after impregnation) of the thermosetting resin 5 is preferably 20% or more and 80% or less. In particular, 40% or more and 70% or less are the most suitable. In order to obtain the resin-impregnated decorative plate 1 excellent in physical properties, it is important to uniformly impregnate the entire base paper 6 with the thermosetting resin 5.

Then, the decorative paper for resin-impregnated decorative plate 4 impregnated with the thermosetting resin 5 is dried to give the resin-impregnated decorative paper 2. Then, the resin-impregnated decorative paper 2 is placed on the base material 3, a metal plate (mirror finished plate) is caused to abut on a surface 2a of the resin-impregnated decorative paper 2, and then heat pressure molding is applied to a laminate of the resin-impregnated decorative paper 2 and the base material 3 to integrate the resin-impregnated decorative paper 2 and the base material 3 to give the resin-impregnated decorative plate 1. At that time, the foaming agents 8 are foamed by the heat in the heat pressure molding, so that places where the foaming agents 8 are arranged of the surface of the resin-impregnated decorative plate 1 are bulged, which results in the formation of the uneven patterns 9. Then, a gross mat feeling and a touch feeling are exhibited in the resin-impregnated decorative plate 1 by the formed uneven patterns 9.

Between the base material 3 and the resin-impregnated decorative paper 2, an adhesive or the like may be interposed or an adhesive or the like may not been interposed. Further, a core paper may be interposed as necessary as with a method adopted for a known melamine resin decorative plate. As the core paper, one in which an appropriate base paper, such as titanium paper, bleached or unbleached kraft paper, or a glass fiber nonwoven fabric, is impregnated with a thermosetting resin in an uncured state is usable, for example. As the thermosetting resin, an arbitrary thermosetting resin is usable according to the physical properties and the like required in the resin-impregnated decorative plate 1 to be targeted. For example, melamine resin, epoxy resin, diallyl phthalate resin, benzoguanamine resin, urethane resin, alkyd resin, unsaturated polyester resin, phenol resin, urea resin, and the like can be adopted. Examples of the core paper include a phenolic resin-impregnated kraft paper conventionally widely adopted as a core paper for a melamine resin decorative plate.

As the heat pressure molding method for bonding the resin-impregnated decorative paper 2 in a state of being laminated on the base material 3, a method including causing a metal plate to abut on the resin-impregnated decorative paper 2, and then performing platen pressing, a cylinder press type continuation lamination system, and the like are usable, for example. In particular, a continuation lamination system using a metal endless belt is preferable. According to the continuation lamination system, the resin-impregnated decorative plate 1 of high quality free from warping, waving, or the like of the surface, having good interlayer adhesiveness, and densely cured and integrated can be continuously manufactured at high speed.

When the continuation lamination system is used, the surface shape of the resin-impregnated decorative plate 1 is the surface shape as it is formed by the metal plate or the metal endless belt used in the continuation lamination system or an embossed sheet produced by a curable resin or the like. Hence, the resin-impregnated decorative plate 1 excellent in surface glossiness or smoothness can be obtained by using one the surface of which is smoothly polished, such as a mirror finished surface, as the metal plate, the metal endless belt, or the embossed sheet produced by a curable resin or the like.

It is a matter of course that the resin-impregnated decorative plate 1 in an arbitrary surface finished state according to the intended use of the resin-impregnated decorative plate 1 to be targeted can also be obtained by using a metal plate, a metal endless belt, or an embossed sheet produced by a curable resin or the like of a desired arbitrary lusterless state or texture state as necessary.

The resin-impregnated decorative plate 1 of the present invention is not limited to the embodiment described above in detail and can be implemented while being variously altered without deviating from the gist of the present invention.

As described above, the decorative paper for resin-impregnated decorative plate 4 according to the embodiment of the present invention includes the base paper 6, the picture pattern layer 7 provided on the surface 6a side of the base paper 6, and the foaming agents 8 arranged on the surface 7a of the picture pattern layer 7 or in the picture pattern layer 7. Then, in the foaming agents 8, the average particle diameter after foaming is set to 15 µm or more and 250 µm or less and the foaming start temperature is set to 100° C. or more and 220° C. or less. Hence, the average particle diameter and the foaming start temperature after foaming of the foaming agents 8 are set to proper numerical values, and therefore the foaming agents 8 can be foamed in the heat pressure molding by a conventional method for manufacturing a resin-impregnated decorative plate, so that the uneven patterns 9 can be properly formed on the surface of the resin-impregnated decorative plate 1. Thus, a gross mat feeling and a touch feeling can be exhibited in the resin-impregnated decorative plate 1. Further, the arbitrary uneven patterns 9 can be given to the surface of the resin-impregnated decorative plate 1 by adjusting the arrangement positions of the foaming agents 8 in the decorative paper for resin-impregnated decorative plate 4, which eliminates the necessity of preparing a metal plate for each uneven pattern 9. Therefore, the decorative paper for resin-impregnated decorative plate 4 capable of forming the resin-impregnated decorative plate 1 excellent in a gross mat expression and a touch feeling can be provided while reducing the cost.

Further, the average particle diameter after foaming of the foaming agents 8 is 15 μm or more and 250 μm or less and the foaming start temperature of the foaming agents 8 is 100° C. or more and 220° C. or less, and therefore the proper uneven patterns 9 can be formed, so that the decorative paper for resin-impregnated decorative plate 4 excellent in a gross mat feeling, a touch feeling, and scratch resistance can be provided.

Further, the decorative paper for resin-impregnated decorative plate 4 according to the embodiment of the present invention can form the resin-impregnated decorative plate 1 in which the picture formed by the picture pattern layer 7 and the uneven patterns 9 on the surface of the resin-impregnated decorative plate 1 are aligned in terms of design because the picture formed by the picture pattern layer 7 and the arrangement position of the foaming agents 8 are aligned.

Further, the average particle diameter before foaming of the foaming agents 8 is ⅔ times or more and 50 times or less the layer thickness of the picture pattern layer 7 in the decorative paper for resin-impregnated decorative plate 4 according to the embodiment of the present invention. Hence, the proper uneven patterns 9 can be formed and the resin-impregnated decorative plate 1 excellent in a gross mat feeling, a touch feeling, and scratch resistance can be provided.

Further, the resin-impregnated decorative paper 2 according to the embodiment of the present invention includes the decorative paper for resin-impregnated decorative plate 4 and the thermosetting resin 5 impregnated into the decorative paper for resin-impregnated decorative plate 4. Therefore, the resin-impregnated decorative paper 2 capable of forming the resin-impregnated decorative plate 1 excellent in a gross mat expression and a touch feeling can be provided while reducing the cost.

Further, the resin-impregnated decorative plate 1 according to the embodiment of the present invention includes the resin-impregnated decorative paper 2 and the base material 3 integrated with the resin-impregnated decorative paper 2. Therefore, the resin-impregnated decorative plate 1 excellent in a gross mat expression and a touch feeling can be provided while reducing the cost.

EXAMPLES

Hereinafter, Examples and Comparative Examples of the resin-impregnated decorative plate 1 according to the present invention are described. The present invention is not limited to Examples described below.

Example 1

First, as illustrated in FIG. 1, a titanium paper for decorative paper having a good water absorbing property and having a basis weight of 80 g/m² was prepared as the base paper 6. Then, a wood grain pattern was printed to one surface (surface 6a) of the base paper 6 with a water-based ink containing casein as a main component to form the picture pattern layer 7 having a layer thickness of 10 μm. As a printing method, a direct gravure printing system was used. Then, a vessel pattern aligned in terms of design with the wood grain pattern of the picture pattern layer 7 was printed in line on the surface 7a of the picture pattern layer 7 with a water-based ink containing casein as a main component containing the foaming agents 8, and then the foaming agents 8 were arranged in the shape of the vessel pattern to form the decorative paper for resin-impregnated decorative plate 4. As a printing method, a direct gravure printing system was used. As the foaming agents 8, one in which the average particle diameter before foaming was 100 μm (10 times the layer thickness of the picture pattern layer 7), the average particle diameter after foaming was 120 μm, and the foaming start temperature was 180° C. was used.

Then, the decorative paper for resin-impregnated decorative plate 4 was impregnated with the thermosetting resin 5, and then the decorative paper for resin-impregnated decorative plate 4 was dried to form the resin-impregnated decorative paper 2. As the thermosetting resin 5, a water-based melamine resin liquid was used. At that time, the impregnation amount of the thermosetting resin was adjusted so that the basis weight of the resin-impregnated decorative paper 2 was 200 g/m². Then, the resin-impregnated decorative paper 2 was placed on the base material 3. As the base material 3, a particle board base material was used. Then, a metal plate was caused to abut on the surface 2a of the resin-impregnated decorative paper 2, and then heat pressure molding was applied to a laminate of the resin-impregnated decorative paper 2 and the base material 3 to integrate the resin-impregnated decorative paper 2 and the base material 3, thereby forming the resin-impregnated decorative plate 1 of Example 1.

Example 2

In Example 2, one in which the average particle diameter after foaming was 15 μm was used as the foaming agents 8. The resin-impregnated decorative plate 1 was produced using the same material and procedure as those of Example 1, except the above.

Example 3

In Example 3, one in which the average particle diameter after foaming was 250 μm was used as the foaming agents 8. The resin-impregnated decorative plate 1 was produced using the same material and procedure as those of Example 1, except the above.

Example 4

In Example 4, one in which the foaming start temperature was 100° C. was used as the foaming agents 8. The resin-impregnated decorative plate 1 was produced using the same material and procedure as those of Example 1, except the above.

Example 5

In Example 5, one in which the foaming start temperature was 220° C. was used as the foaming agents 8. The resin-impregnated decorative plate 1 was produced using the same material and procedure as those of Example 1, except the above.

Example 6

In Example 6, one in which the average particle diameter before foaming was ⅔ times the layer thickness of the picture pattern layer 7 was used as the foaming agents 8. The resin-impregnated decorative plate 1 was produced in the same material and procedure as Example 1, except the above.

Example 7

In Example 7, one in which the average particle diameter before foaming was 50 times the layer thickness of the picture pattern layer 7 was used as the foaming agents 8. The resin-impregnated decorative plate 1 was produced in the same material and procedure as Example 1, except the above.

Example 8

In Example 8, one in which the average particle diameter before foaming was ⅓ times the layer thickness of the picture pattern layer 7 was used as the foaming agents 8. The resin-impregnated decorative plate 1 was produced in the same material and procedure as Example 1, except the above.

Example 9

In Example 9, one in which the average particle diameter before foaming was 52 times the layer thickness of the picture pattern layer 7 was used as the foaming agents 8. The resin-impregnated decorative plate 1 was produced in the same material and procedure as Example 1, except the above.

Comparative Example 1

In Comparative Example 1, one in which the average particle diameter after foaming was 10 µm was used as the foaming agents 8. The resin-impregnated decorative plate 1 was produced using the same material and procedure as those of Example 1, except the above.

Comparative Example 2

In Comparative Example 2, one in which the average particle diameter after foaming was 13 µm was used as the foaming agents 8. The resin-impregnated decorative plate 1 was produced using the same material and procedure as those of Example 1, except the above.

Comparative Example 3

In Comparative Example 3, one in which the average particle diameter after foaming was 260 µm was used as the foaming agents 8. The resin-impregnated decorative plate 1 was produced using the same material and procedure as those of Example 1, except the above.

Comparative Example 4

In Comparative Example 4, one in which the average particle diameter after foaming was 252 µm was used as the foaming agents 8. The resin-impregnated decorative plate 1 was produced using the same material and procedure as those of Example 1, except the above.

Comparative Example 5

In Comparative Example 5, one in which the foaming start temperature was 90° C. was used as the foaming agents 8. The resin-impregnated decorative plate 1 was produced using the same material and procedure as those of Example 1, except the above.

Comparative Example 6

In Comparative Example 6, one in which the foaming start temperature was 98° C. was used as the foaming agents 8. The resin-impregnated decorative plate 1 was produced using the same material and procedure as those of Example 1, except the above.

Comparative Example 7

In Comparative Example 7, one in which the foaming start temperature was 230° C. was used as the foaming agents 8. The resin-impregnated decorative plate 1 was produced using the same material and procedure as those of Example 1, except the above.

Comparative Example 8

In Comparative Example 8, one in which the foaming start temperature was 222° C. was used as the foaming agents 8. The resin-impregnated decorative plate 1 was produced using the same material and procedure as those of Example 1, except the above.

(Performance Evaluation)

Performance evaluation described below was performed to the resin-impregnated decorative plates 1 of Examples 1 to 9 and Comparative Examples 1 to 8.

(Gross Mat Expression Test)

A gross mat expression test evaluated the degree of a gross mat expression exhibited in the resin-impregnated decorative plates 1. A case where the gross mat expression was excellent was evaluated as "⊚", a case where the gross mat expression was sufficient was evaluated as "○", a case where the gross mat expression was hardly exhibited was evaluated as "Δ", and a case where the gross mat expression was not exhibited at all was evaluated as "x".

(Touch Feeling Test)

A tough feeling test evaluated the degree of a touch feeling exhibited in the resin-impregnated decorative plates 1. A case where the touch feeling was excellent was evaluated as "⊚", a case where the touch feeling was sufficient was evaluated as "○", a case where the touch feeling was hardly exhibited was evaluated as "Δ", and a case where the touch feeling was not exhibited at all was evaluated as "x".

(Scratch Resistance Test)

In a scratch resistance test, a coin scratch test was carried out to the resin-impregnated decorative plates 1, and then a state of scratches in the uneven patterns 9 was evaluated. A case where there were no scratches was evaluated as "⊚", a case where there were few scratches was evaluated as "○", a case where there were shallow but conspicuous scratches was evaluated as "Δ", and a case where there were conspicuous and deep scratches was evaluated as "x".

(Evaluation Results)

These evaluation results are illustrated in Table 1.

TABLE 1

| | Foaming agent | | | | | |
|---|---|---|---|---|---|---|
| | Average particle diameter after foaming [μm] | Foaming start temperature [° C.] | Average particle diameter before foaming/Layer thickness of picture pattern layer [—] | Gross mat expression test | Touch feeling test | Scratch resistance test |
| Ex. 1 | 120 | 180 | 10 | ◉ | ◉ | ◉ |
| Ex. 2 | 15 | 180 | 10 | ◉ | ◉ | ◉ |
| Ex. 3 | 250 | 180 | 10 | ◉ | ◉ | ◉ |
| Ex. 4 | 120 | 100 | 10 | ◉ | ◉ | ◉ |
| Ex. 5 | 120 | 220 | 10 | ◉ | ◉ | ◉ |
| Ex. 6 | 120 | 180 | 2/3 | ◉ | ◉ | ◉ |
| Ex. 7 | 120 | 180 | 50 | ◉ | ◉ | ◉ |
| Ex. 8 | 120 | 180 | 1/3 | ○ | ◉ | ◉ |
| Ex. 9 | 120 | 180 | 52 | ◉ | ◉ | ○ |
| Comp. Ex. 1 | 10 | 180 | 10 | x | x | ◉ |
| Comp. Ex. 2 | 13 | 180 | 10 | x | x | ◉ |
| Comp. Ex. 3 | 260 | 180 | 10 | ○ | ○ | x |
| Comp. Ex. 4 | 252 | 180 | 10 | ○ | ○ | x |
| Comp. Ex. 5 | 120 | 90 | 10 | Δ | x | ◉ |
| Comp. Ex. 6 | 120 | 98 | 10 | Δ | x | ◉ |
| Comp. Ex. 7 | 120 | 230 | 10 | Δ | Δ | ◉ |
| Comp. Ex. 8 | 120 | 222 | 10 | Δ | Δ | ◉ |

As illustrated in Table 1, the resin-impregnated decorative plates 1 of Examples 1 to 9 were evaluated to be equal to or higher than "◉" in the gross mat expression test, the touch feeling test, and the scratch resistance test. Whereas, the resin-impregnated decorative plates 1 of Comparative Examples 1 to 8 were evaluated to be equal to or lower than "Δ" in any of the gross mat expression test, the touch feeling test, and the scratch resistance test.

Specifically, the resin-impregnated decorative plates 1 of Comparative Examples 1 and 2 were evaluated as "x" in the gross mat expression test and the touch feeling test because, due to the use of the foaming agents 8 in which the average particle diameter after foaming was small, the gross mat feeling and the touch feeling were weakened. The resin-impregnated decorative plates 1 of Comparative Examples 3 and 4 were evaluated as "x" in the scratch resistance test because, due to the use of the foaming agents 8 in which the average particle diameter after foaming was large, the foaming agents 8 after foaming dropped or the like, so that the scratch resistance was weakened. The resin-impregnated decorative plates 1 of Comparative Examples 5 and 6 were evaluated as "Δ" in the gross mat expression test and evaluated as "x" in the touch feeling test because, due to the use of the foaming agents 8 in which the foaming start temperature was low, the foaming agents 8 after foaming were heated and pressed fora prolonged period of time, so that the foaming agents 8 after foaming were crushed. The resin-impregnated decorative plates 1 of Comparative Examples 7 and 8 were evaluated as "Δ" in the gross mat expression test and the touch feeling test because, due to the use of the foaming agents 8 in which the foaming start temperature was high, the foaming agents 8 were not sufficiently foamed in the heat pressure molding.

Whereas, the resin-impregnated decorative plates 1 of Examples 1 to 9 were evaluated as "◉" in the gross mat expression test and the touch feeling test and evaluated as "○" in the scratch resistance test because the average particle diameter after foaming of the foaming agents 8 and the foaming start temperature of the foaming agents 8 were proper numerical values, so that the foaming agents 8 were properly foamed in the heat pressure molding.

Therefore, it was confirmed that the resin-impregnated decorative plates 1 of Examples 1 to 9 have a gross mat expression, a touch feeling, and scratch resistance more satisfactory than those the resin-impregnated decorative plates 1 of Comparative Examples 1 to 8.

REFERENCE SIGNS LIST

1 resin-impregnated decorative plate
2 resin-impregnated decorative paper
2a surface
3 base material
3a surface
4 decorative paper for resin-impregnated decorative plate
5 thermosetting resin
6 base paper
6a surface
7 picture pattern layer
7a surface
8 foaming agent
9 uneven pattern

The invention claimed is:

1. A resin-impregnated decorative plate comprising:
a decorative paper; and
a thermosetting resin impregnated into the decorative paper;
the decorative paper comprising:
a base paper;
a picture pattern layer provided on a surface side of the base paper; and
a foaming agent arranged on a surface of the picture pattern layer or in the picture pattern layer, wherein
an average particle diameter after foaming of the foaming agent is 15 μm or more and 250 μm or less and a foaming start temperature the foaming agent is 100° C. or more and 220° C. or less, and
an average particle diameter before foaming of the foaming agent is 2/3 times or more and 50 times or less than a layer thickness of the picture pattern layer, and
wherein the impregnating thermosetting resin forms a resin layer having a plurality of uneven patterns which are arranged on and aligned with the foaming agent, and the uneven patterns having no scratches in a scratch resistance test.

2. The resin-impregnated decorative plate according to claim 1, wherein
the foaming agent is aligned with a picture formed by the picture pattern layer.

3. The resin-impregnated decorative plate according to claim 1, further comprising:
a base material integrated with the resin-impregnated decorative paper.

4. The resin-impregnated decorative plate according to claim 1, wherein the average particle diameter before foaming of the foaming agent is 10 times or more and 50 times or less than the layer thickness of the picture pattern layer and the layer thickness of the picture pattern layer is 10 μm.

* * * * *